United States Patent [19]

Karibe et al.

[11] Patent Number: 4,864,448
[45] Date of Patent: Sep. 5, 1989

[54] TAPE CASSETTE

[75] Inventors: Haruyuki Karibe; Takashi Oogi; Tadao Igarashi, all of Tokyo, Japan

[73] Assignee: Sony Corporation, Tokyo, Japan

[21] Appl. No.: 125,562

[22] Filed: Nov. 25, 1987

[30] Foreign Application Priority Data

Dec. 4, 1986 [JP] Japan .................. 61-186946[U]

[51] Int. Cl.⁴ .................. G11B 23/02; G11B 15/04
[52] U.S. Cl. .................. 360/132; 360/60
[58] Field of Search .................. 360/132, 60; 242/197-200

[56] References Cited

U.S. PATENT DOCUMENTS 4,743,984  5/1988  Ryan .................. 360/132 X

Primary Examiner—A. J. Heinz
Attorney, Agent, or Firm—Lewis H. Eslinger; Jay H. Maioli

[57] ABSTRACT

A tape cassette has indicating means for indicating various information about the tape cassette itself, and the indicating means is so disposed as to be interposed between a pair of reels which are arranged within the cassette casing.

6 Claims, 4 Drawing Sheets

TAPE CASSETTE

BACKGROUND OF THE INVENTION

1. Field of the Invention

This invention relates to a tape cassette, and more specifically is directed to a tape cassette used for a magnetic recording and/or reproducing apparatus and having cassette status indicators.

2. Description of the Prior Art

The conventional tape cassette for a video tape recorder that is provided with a plurality of cassette status indicators arranged in line within the rear side wall of the cassette casing, generally increases the complexity of the structure thereof, because means for detecting the indicators provided in the rear side wall spaced apart from the tape cassette while the tape cassette is inserted in the video tape recorder (hereinafter described as VTR), and must be put in action after the tape cassette is completely mounted.

Such a tape cassette as disclosed in U.S. Pat. No. 4,339,776, wherein the indicators are arranged in line in the top wall or the bottom wall thereof, is also well-known, but in such case, the indicators are generally placed in the corners near the rear end of the top wall or the bottom wall, so that the following problems are offered.

(1) The arrangement and structure of the detecting mechanism for detecting the indicators are restricted.

(2) The indicators easily break when the tape cassette is inadvertently dropped.

OBJECTS AND SUMMARY OF THE INVENTION

Accordingly, it is an object of the present invention to provide a tape cassette free from the above mentioned disadvantages.

Another object of this invention is to provide a tape cassette having cassette status indicators which are easily detected by a magnetic recording and/or reproducing apparatus.

According to an aspect of the present invention, there is provided a tape cassette including a casing of generally rectangular configuration having a top wall, a bottom wall and a peripheral wall extending along the sides thereof; a pair of tape reels rotatably mounted in the casing in co-planar and side-by-side relationship with each other; a tape wound on the respective reels and extending with a predetermined length between the reels; an opening that is provided in the casing so as to be extended to locations adjacent to each of the reels, and through which the tape passes substantially with the predetermined length outside the casing; and means located between the pair of tape reels so as to have the status of the tape cassette indicated.

The above and other objects, features and advantages of this invention, will be apparent from the following detailed description of illustrative embodiments which is to be read in connection with the accompanying drawings.

DETAILED DESCRIPTION OF A PREFERRED EMBODIMENT

Before proceeding with a detailed description of an embodiment of this invention, an example of a conventional tape cassette to which this invention may be applied will be described for the purpose of clearly contrasting this invention from that which came before it.

Figure 1:
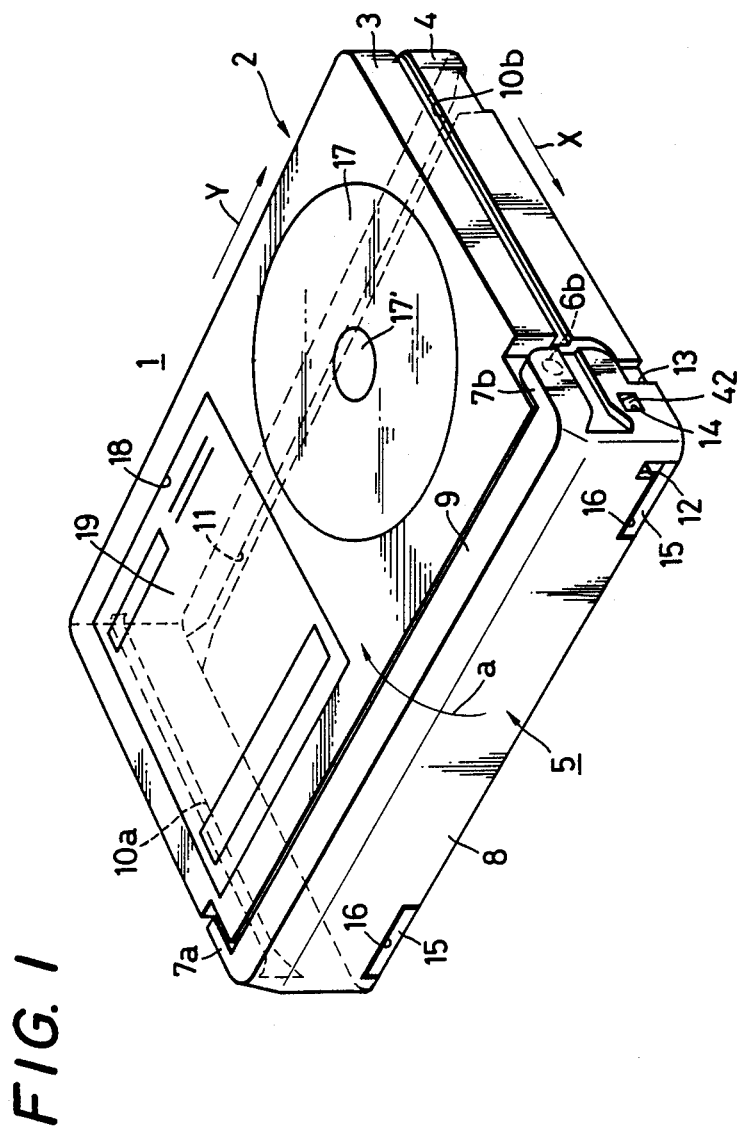
FIG. 1 is a perspective view of a tape cassette to which this invention may be applied.

The tape cassette 1 used on a VTR has the shape of a flat rectangular parallelepiped as shown in FIG. 1, and has a cassette casing 2 which consists of an upper half section 3 and a lower half section 4, both molded of strong synthetic resin, for example, A.B.S. resin. In the casing 2, a supply reel and a take-up reel are arranged for winding magnetic tape thereon. The tape cassette 1 further includes a lid 5 which is also molded of synthetic resin and which includes a pair of ears 7a and 7b directed rearward from the opposite ends of a front portion 8. Pins 6a and 6b are formed integrally with the ears 7a and 7b, respectively, and project toward each other from those parallel ears. These pins 6a and 6b are rotatably supported in apertures of the side wall of the cassette casing 2, whereby the lid 5 is rotatably mounted in the cassette casing 2. The front portion 8 of the lid 5 depends from the edge of an elongated top portion 9 of that lid, and the lid 5 is elastically urged to rotate so as to close the front opening of the cassette casing 2.

Figure 2:
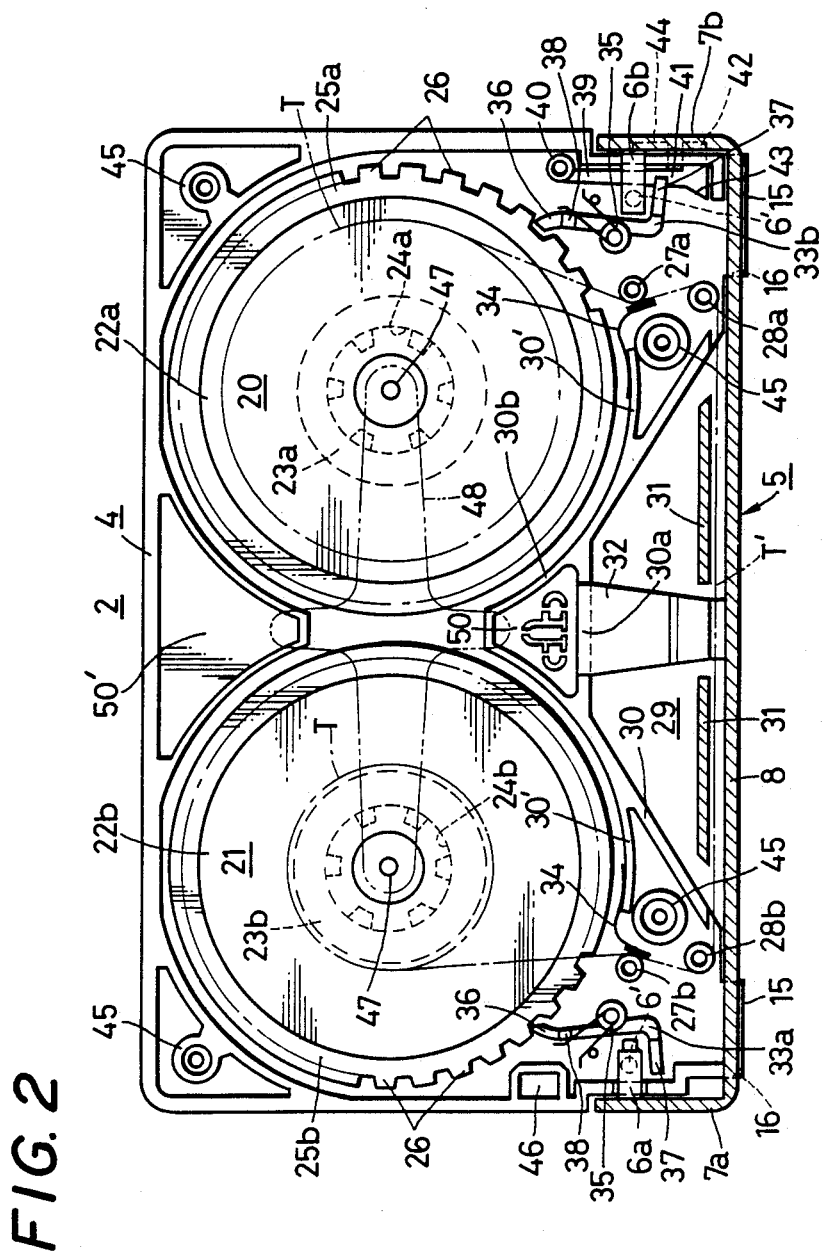
FIG. 2 is a plan view of the tape cassette shown in FIG. 1, the upper half section of the casing being taken off, and a pair of conventional brake levers being arranged therein.

Four bosses 45 are integrally formed with the lower half section 4 of the cassette casing 2 as shown in FIG. 2. The top surfaces of the bosses 45 are spot-faced, and through holes are formed in the bosses 45. Against the bosses 45, four corresponding projections with respective threaded holes are formed on the upper half section 3. The bosses 45 and the projections are abutted against one another and are connected by screws, whereby the upper half section 3 and the lower half section 4 are coupled to form the cassette casing 2. A frangible tab 46 is formed at the side wall of the lower half section 4 of the cassette casing 2. When the frangible tab 46 is taken off, inadvertent erasing of the signals recorded on the magnetic tape is prevented.

Guide grooves 10a and 10b are formed in the outer surfaces of the relatively short side walls of cassette casing 2 and extend into the adjacent ears 7a and 7b of the lid 5 when the latter is in its closed position. Further, the undersurface of the bottom wall of the cassette casing 2 is formed with a guide groove 11 extending parallel to the long open side of the cassette casing 2. These guide grooves 10a, 10b and 11 constitute means for guiding the tape cassette 1 during its insertion into a cassette holder of the cassette loading mechanism of a VTR That is, guide ridges or rails of the cassette holder are led into the grooves 10a and 10b when the cassette 1 is inserted into the holder in the direction shown by arrow X in FIG. 1, and a guide ridge of the cassette holder is led into the groove 11 when the cassette 1 is inserted into the holder in the direction shown by arrow Y in FIG. 1.

The lid 5 is opened by a lid opening means which rotates the former in the direction shown by arrow a in FIG. 1 when the tape cassette 1 is held in the cassette holder of the VTR, causing the magnetic tape extending across the front opening of the cassette 1 to be exposed. The lid 5, which is urged in the closed direction, is normally locked by a lock lever arranged inside the cassette casing 2 to prevent the inadvertent opening of the lid 5 when the tape cassette 1 is not used. That is, the lock lever is arranged at the right corner of the front side in the cassette casing 2. Corresponding to the lock lever, a pair of cut-out portions 12 and 13 are formed in the front surface and side surface of the cassette casing 2, respectively, to receive a lock releasing member. The lock releasing member is led into the cut-out portions 12 or 13 to displace the lock lever into an inactive position, allowing the lid 5 to be opened. A rectangular opening 14 is formed on the ear 7b of the lid 5. This opening 14 engages with a lock portion of the lock lever. A pair of recesses are formed at both ends of the lower edge of the lid 5, and the recesses 16 receive respective projections 15 formed on the front side of the lower half section 4 of the tape cassette 1.

The lock lever 39 is molded of synthetic resin and is pivoted at the right corner of the front side in the cassette casing 2. The lever includes a cylindrical portion 40, by which the lever is pivotally supported, and an arm 41 extending from the cylindrical portion 40. At the top of the arm 41, a locking projection 42 is formed. The projection 42 engages with the rectangular opening 14 (FIG. 1) to lock the lid 5. Further, the arm 41 has a slanted portion 43 and a rectangular parallelepiped projection 44. When the tape cassette 1 is inserted into the cassette holder, the releasing member pushes the slanted projection 43 or the projection 44 to rotate the lever 39 clockwise against torsion spring. As a result, the locking projection 42 is disengaged from the opening 14 and the the lid 5 is unlocked.

The tape cassette 1 further includes a round transparent window 17 on the upper half section 3 to allow the viewing of the magnetic tape wound on the supply reel. The round window 17 has an opaque mask 17' at its center. Beside the window 17, a rectangular recess 18 is formed wherein a label 19 can be attached.

Next, there will be described the inner structure of the tape cassette 1 with reference to FIG. 2 wherein the upper half section 3 is taken off and the lid 5 is cross-sectioned. As shown in FIG. 2, a pair of reels 20 and 21 are arranged in the cassette casing 2, separated from each other by a predetermined distance. The supply reel 20 includes an upper flange 22a, a reel hub 23a and a lower flange 25a. Similarly, the take up reel 21 includes an upper flange 22b, a reel hub 23b and a lower flange 25b. A magnetic tape T, shown by chain-dot line in FIG. 2, is wound on the reel hubs 23a and 23b. Hollow portions 24a and 24b are formed at the centers of the reel hubs 23a and 23b, respectively, to receive respective reel drive shafts. Rectangular teeth 26 are formed at the marginal portions of the lower flanges 25a and 25b. The magnetic tape T supplied from the reel 20 is conventionally guided by guide members 27a and 28a to the inside of the front portion of the lid 5, and then the tape T is guided by guide members 28b and 27b and is led to the take-up reel 21. Further, in the conventional tape cassette 1, a pair of resilient tape-slack preventing members 34 are arranged in the cassette casing 2. The members 34 are made of resilient synthetic resin and the tops of the members 34 push the tape T against the peripheral surfaces of the guide members 27a and 27b to prevent the tape T from becoming slacked. The bottoms of the members 34 are attached to ribs 30' which are connected with separating walls 30.

The top ends of the above mentioned hollow portions 24a and 24b are closed, and the tops of the hubs 23a and 23b are projected over the top surfaces of the upper flanges 22a and 22b. Steel balls 47 are arranged at the top of the hubs 23a and 23b. The steel balls 47 constitute the bearing members of the reels 20 and 21 when the reels are rotated and the magnetic tape moves. The steel balls 47 are held by a cross-shaped leaf spring 48 made of stainless steel. The leaf spring 48 is sustained on the inner surface of the upper half section 3 of the cassette casing 2 as shown by the chain-dot line in FIG. 2.

The magnetic tape T' extending between the guide members 28a and 28b is exposed to the outside of the cassette when the lid 5 is opened as mentioned above. When the tape T' is so exposed, a tape loading member (not shown) can be inserted between it and the center of the cassette to access the tape for the reading or recording of information. To accomplish the insertion of the loading member, a mountain-shaped hollow portion 29 is defined at the front end of the lower half section 4, and the hollow portion 29 is separated from the inside portion of the cassette casing 2 by the separating walls 30. A protecting plate 31 is integrally formed with the top portion 9 of the lid 5. The protecting plate 31 is positioned at the front side of the hollow portion 29 and is parallel to the front portion 8 of the lid 5. Further, the protecting plate 31 is divided into two portions, and a free end of a holding member 32, integrally formed with the separating wall 30, is positioned between the two portions of the plate 31.

The conventional tape cassette 1 includes a pair of brake levers 33a and 33b for engaging with the rectangular teeth 26 of the reels 20 and 21. The levers 33a and 33b are pivoted at the left and right corners, respectively, of the front side in the cassette casing 2, and the levers 33a and 33b are controlled by actuating projections 6' formed integrally with the pivot pins 6a and 6b of the lid 5. That is, the tops of the levers 33a and 33b engage with the rectangular teeth 26 of the reels 20 and 21 to prevent the reels 20 and 21 from rotating, because the actuating projections 6' do not actuate the levers 33a and 33b when the lid 5 is closed. But, when the lid 5 is opened, the actuating projections 6' push the levers 33a and 33b, and the lever 33a rotates counter-clockwise and the lever 33b rotates clockwise, as shown in FIG. 2, against urging forces of respective torsion springs to disengage the lever 33a and 33b from the teeth 26 of their respective reels.

Each of the lever 33a and 33b is molded of synthetic resin and includes a cylindrical portion 35, which is pivoted within the cassette casing 2. An engaging portion 36 and a contacting projection 37 extend from the cylindrical portion 35, and further a hook portion 38 is integrally formed on the engaging portion 36, and the lever 33b is symmetric with the lever 33a as shown in FIG. 2.

Thus, it will be seen that the above-mentioned tape cassette 1 is provided with many parts within the cassette casing and some of the parts are arranged in the corners of the cassette casing 2, so that it is difficult to accommodate additional parts or elements therein. According to the present invention, cassette status indicators are arranged in center triangular portions 50 or 50' of the lower half section 4 as shown in FIG. 2, and hence it becomes easier for the VTR to detect the status of the cassette 1.

Figure 3:
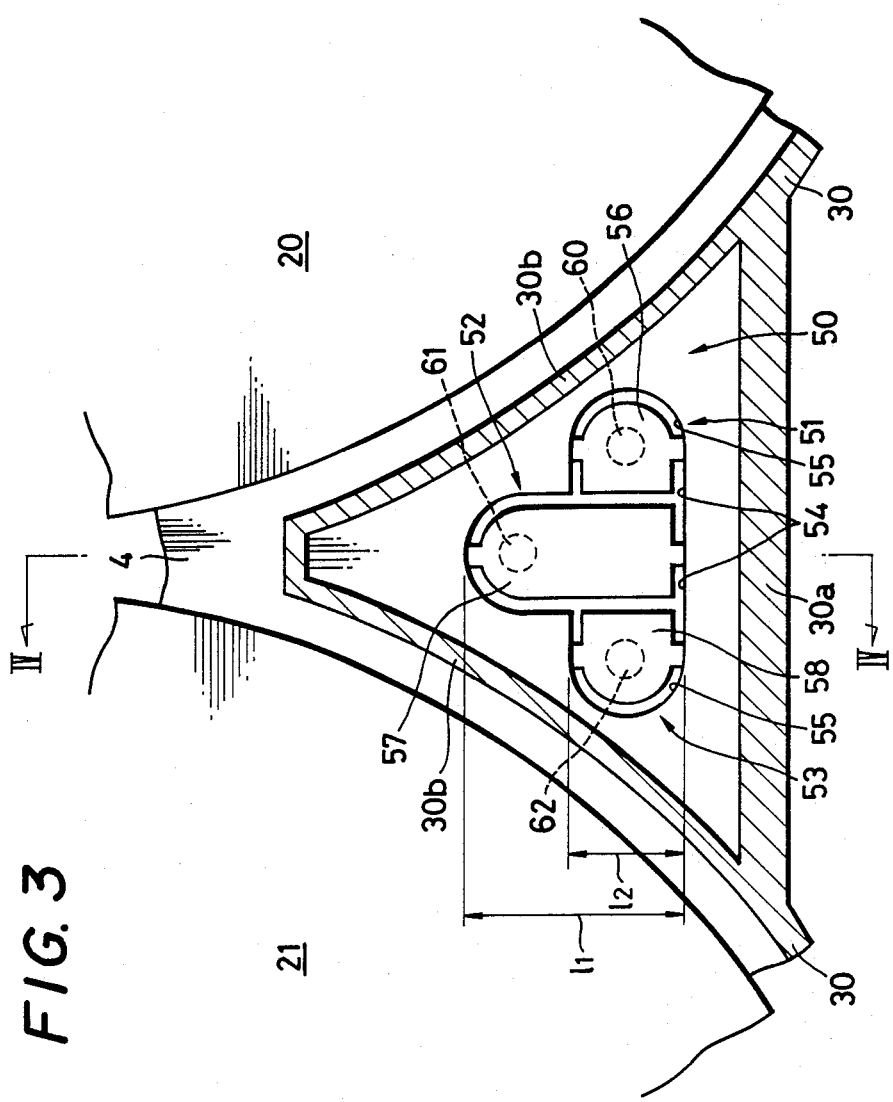
FIG. 3 is a partial plan view of a tape cassette according to one embodiment of this invention.

Now, one embodiment of this invention will be described with reference to FIGS. 3 and 4. FIG. 3 shows a center portion of the front side of the tape cassette according to this invention. As shown in FIG. 3, a pair of right and left arc-like guide walls 30b extending respectively along the two reels 20 and 21 are so formed integrally with the bottom wall of the lower half section 4 as to vertically protrude therefrom between the reels 20 and 21 in the rear of the central part 30a of the separating wall 30, and such separating wall 30 and guide walls 30b are also provided in the upper half section 3.

A plurality of indicators, such as three indicators 51, 52 and 53 shown in FIG. 3, are prepared in a substantially triangular portion of the bottom wall of the lower half section 4, which is surrounded by the central part 30a of the separating wall 30 and the guide walls 30b.

The three indicators 51, 52 and 53 are constituted as follows. A pair of substantially T-shaped cutouts 54 and a pair of arc-like cutouts 55 are provided in the triangular portion of the bottom wall of the lower half section 4, so that three detected pieces 56, 57 and 58 arranged in a line in the right to left direction of the cassette are formed. Thus, the three detected pieces 56, 57 and 58 can be easily broken off due to the cutouts 54 and 55 surrounding the detected pieces 56, 57 and 58.

The central one 52 of the three indicators 51, 52 and 53 is larger in length than the rest 51 and 53, when measured in the front to rear direction of the triangular portion. That is, the triangular portion 50 is effectively utilized, so that the length $l_1$ of the central indicator 52 is twice as large as the length $l_2$ of the rest 51 and 53.

Figure 4:
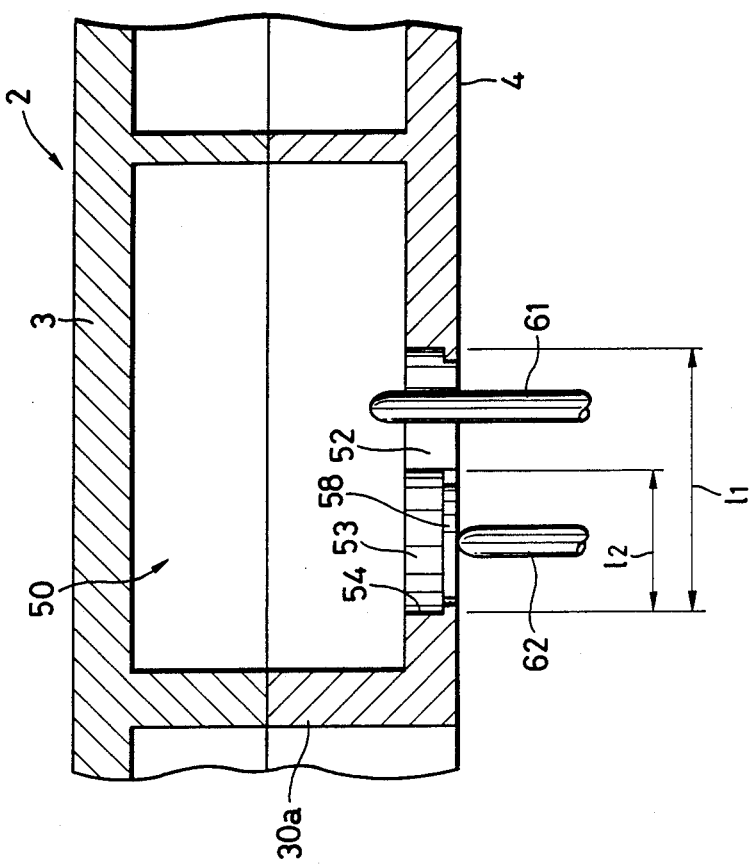
FIG. 4 is a cross-sectional view taken along the line IV—IV in FIG. 3.

When the above tape cassette is mounted in the VTR, the indicators 51, 52 and 53 are detected by detecting pins 60, 61 and 62, respectively, and as shown in FIG. 4, the detecting pin 62 abuts against the corresponding detected piece 58 that is not broken off, while the detecting pin 61 passes through the triangular portion 50, if the corresponding detected piece 57 has been broken off. Thus, necessary information about the tape cassette, such as tape lengh, automatic rewind instruction after changing modes, or reproducing, which is different in the kind of tapes, is given, if the detected pieces 56, 57, 58 are selectively broken off.

As the central indicator 52 is formed larger in length than the rest 51 of the indicators and 53, the position and construction of the detecting pin 61 for detecting the central indicator 52 can be determined freely within the extent of the large length $l_1$ of the indicator 52, which extends in the front to near direction of the triangular portion 50, and if the detecting pin 61 is biased toward the rear portion of the indicator 52 as shown in FIG. 4, it is easy to enable the detecting pin 61 to be spaced apart sufficient distances from the detecting pins 60 and 62, so that the position and construction of the respective detecting pins 60 and 62 are more freely determined.

What is claimed is:

1. A tape cassette comprising:
   a casing of generally rectangular configuration having a top wall, a bottom wall and a peripheral wall extending along the sides thereof;
   a pair of tape reels rotatably mounted in said casing in co-planar, side-by-side, and spaced-apart relationship with each other;
   a tape wound on said pair of tape reels and extending with a predetermined length between said reels;
   an opening provided in said casing and extending to points adjacent each of said reels, and through which said tape passes for extending with said predetermined length outside said casing; and
   indicating means located in said casing between said pair of tape reels for indicating a status of said tape cassette and comprising three detected pieces which are partially surrounded by cutouts formed through said bottom wall of the casing and which include frangible elements so that said detected pieces can be selectively removed from said casing, said three detected pieces being aligned side-by-side, and in which a center one of said three detected pieces is longer than the two detected pieces on either side thereof, so that one end of said center one extends beyond said two detected pieces on either side, and said one end is held in said casing by one of said frangible elements, so that in breaking said frangible element at said one end said two detected pieces on either side are undisturbed.

2. A tape cassette according to claim 1, in which each of said three detected pieces include at least two of said frangible elements.

3. A tape cassette according to claim 1, in which said indicating means is formed in a substantially triangular portion of said bottom wall which is positioned between said pair of tape reels.

4. A tape cassette according to claim 3, in which said substantially triangular portion is surrounded by guide walls for guiding said pair of reels and a separating wall for separating said opening of the casing from an inside of the casing.

5. A tape cassette according to claim 1, in which said three detected pieces are of substantially rectangular shape and are arranged in a substantially triangular portion positioned between said pair of tape reels.

6. A tape cassette according to claim 1, in which said center one of said three detected pieces is two times longer than said adjacent detected side pieces.

* * * * *